United States Patent
Reid

[11] Patent Number: 5,885,450
[45] Date of Patent: Mar. 23, 1999

[54] VESSEL WITH CAPTIVE TUBE SUPPORT RING

[76] Inventor: Roger P. Reid, P.O. Box 1359, Caldwell, Id. 83606

[21] Appl. No.: 761,121

[22] Filed: Dec. 6, 1996

Related U.S. Application Data

[63] Continuation-in-part of Ser. No. 689,883, Aug. 14, 1996.

[51] Int. Cl.[6] .................................................. B01D 35/02
[52] U.S. Cl. .......................... 210/232; 210/450; 210/460; 210/463; 285/8; 285/11; 285/31; 285/95; 285/104; 285/108
[58] Field of Search .................................. 285/8, 10, 11, 285/18, 31, 32, 95, 104, 108, 109, 113, 322, 323; 210/232, 460, 461, 463, 450

[56] References Cited

U.S. PATENT DOCUMENTS

| | | | |
|---|---|---|---|
| 3,732,985 | 5/1973 | Murrell | 210/479 |
| 3,749,250 | 7/1973 | Oldford | 210/460 |
| 4,160,738 | 7/1979 | Guter | 210/232 |
| 4,178,023 | 12/1979 | Guest | 285/323 |
| 4,229,025 | 10/1980 | Volgstadt et al. | 285/105 |
| 4,282,175 | 8/1981 | Volgstadt et al. | 264/248 |
| 4,407,526 | 10/1983 | Cicenas | 285/242 |
| 4,626,350 | 12/1986 | Reid | 210/282 |
| 4,628,965 | 12/1986 | Passerell | 138/89 |
| 4,645,245 | 2/1987 | Cunningham | 285/321 |
| 4,712,813 | 12/1987 | Passerell et al. | 285/250 |
| 4,770,768 | 9/1988 | Lang | 210/232 |
| 4,895,655 | 1/1990 | Schindler | 210/423 |
| 5,230,539 | 7/1993 | Olson | 285/323 |
| 5,257,825 | 11/1993 | Wilcock | 285/156 |
| 5,468,028 | 11/1995 | Olson | 285/322 |
| 5,591,332 | 1/1997 | Reid et al. | 210/235 |
| 5,635,058 | 6/1997 | Bowman | 210/232 |

OTHER PUBLICATIONS

Brass Fittings and Valves Catalog 3501–E, Parker Fluid Connectors, Parker Hannifin Corporation, Brass Products Division, 300 Parker Drive, Otsego, Michigan 49078, p. 67, Feb. 1984.

*Primary Examiner*—W. L. Walker
*Attorney, Agent, or Firm*—Ken J. Pedersen; Barbara S. Pedersen

[57] ABSTRACT

A water purifier includes a quick connect connector in a port that receives a tube that carries the water. The tube is received along the axis of the port in a first reference direction along the axis. The connector is assembled by inserting, in sequence, a support ring, an O-ring, and a plug into the port along the axis, but in a direction opposite the first direction. The plug is held in place by adhesive or conventional welding. To complete the assembly, a collet is inserted into the port along the axis and in the first direction. A tube is then connected to the water purifier by urging the tube through the collet, along the axis, and in the first direction. The tube is gripped by the collet, supported by the support ring, sealed by the O-ring, and stopped against the plug.

20 Claims, 5 Drawing Sheets

VESSEL WITH CAPTIVE TUBE SUPPORT RING

CROSS REFERENCE TO RELATED APPLICATIONS

This application is a continuation in part application of, and claims piority from, U.S. patent application Ser. No. 08/689,883, filed on Aug. 14, 1996, incorporated herein by this reference and still pending.

BACKGROUND OF THE INVENTION

1. Field of the Invention

Embodiments of the present invention relate to water purification and to systems for fluidtight connections in fluid processing systems.

2. Background

The incorporated parent application provides an introduction to problems solved by the present invention. In addition, consider conventional fluid processing systems having an emphasis on sealed vessels and ultra-pure processes. Conventional fluid processing systems include, for example, water purification systems manufactured for high volume applications such as commercial carbonated beverage dispensers and residential ice making systems.

In such systems, reducing the labor element of equipment manufacturing costs is critical to market penetration and retention. Without a reliable water purifier having simpler parts and involving simpler manufacturing methods, the cost of water purification will remain high. As a consequence, more widespread use of reliable water purification will remain unnecessarily restricted in important markets that affect personal care, national health and safety, and economic development in countries throughout the world. Additional restrictions in related markets will persist for fluid processing equipment, of which water purification systems are but one example.

In view of the problems described above and related problems that consequently become apparent to those skilled in the applicable arts, the need remains in fluid processing for reliable fluidtight connections.

SUMMARY OF THE INVENTION

A water purifier according to a first embodiment receives a tube. The tube is used for conducting water either into or away from the purifier. The purifier includes a collet, a collet retainer, apparatus for purifying the water, an enclosure, an O-ring, and a support ring. The collet retainer holds the collet while the collet engages onto the tube. The apparatus for purifying water is in fluid communication with the tube. The collet retainer is joined to the enclosure. The enclosure includes a coaxially stepped bore. The bore includes a first step at a first diameter, and a second step at a second diameter greater than the first diameter. The first step provides a sealing surface and the second step provides a supporting surface. The O-ring rests on the sealing surface for sealing the tube to the sealing surface. The support ring is in mechanical communication with the first step to retain the O-ring on the sealing surface. The support ring is in further mechanical communication with the supporting surface, wherein the support resists a radial moment in the tube by coupling the moment to the enclosure through the support ring.

In another embodiment, a water purifier includes water purifying apparatus within an enclosure. The enclosure includes a bore, a support ring, an O-ring, and a plug. Water is conducted to the water purifier via a provided tube. The enclosure surrounds the water purifying apparatus. The bore includes a frustoconical surface near a first end of the bore and an abutment surface within the bore. The support ring is located within the bore and in mechanical communication with the abutment surface. The plug is joined to the bore at a second end of the bore. The O-ring seals the tube to the enclosure. The plug retains the O-ring and the support ring in the bore.

According to a first aspect of these embodiments, the support ring limits radial movement of the tube in a region near the O-ring. By limiting radial movement, a fluidtight seal is maintained within a range of motion allowed by the seal.

According to an aspect of the later embodiment, the bore comprises both a frustoconical surface and an abutment surface. The functions of the collet retainer and stepped bore in the former embodiment are performed primarily by the bore in the later embodiment. Manufacturing for the later embodiment is simplified, reducing costs, and consequently opening new markets for water purifiers of the present invention.

According to a method, in one embodiment of the present invention, a vessel for fluid processing is assembled by inserting, in sequence, a support ring, and an O-ring into a bore. The vessel has a bore for receiving a tube. The bore has an axis. The axis is an axis of assembly and not necessarily an axis of symmetry of the vessel. Axial assembly of the vessel proceeds in part in a first direction into the enclosed space of the vessel and in part in an opposite, second, direction away from the enclosed space. The tube is introduced into the assembled vessel in the first direction. The support ring and the O-ring are inserted in the second direction. In a final step, a plug is joined to the vessel over the bore.

According to a first aspect of such a method, assembly is simpler an prior devices. Simpler assembly results in lower manufacturing costs and so provides a marketing advantage.

According to another aspect, a fluidtight seal is maintained by cooperation of the O-ring and support ring in the bore. The support ring limits radial movement of the tube in a region near the O-ring. By limiting radial movement, a fluidtight seal is maintained within a range of motion allowed by the seal.

According to still another aspect, the aforementioned step, involving joining a collet retainer to a portion of a vessel, is replace by a step of joining a plug to a portion of the vessel. The later step is simpler to complete without affecting the reliability of the fluidtight seal between the vessel and the tube.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

Those of ordinary skill in the art will recognize where portions of a figure have been expanded to clarify the presentation.

In all parts shown in the figures, circular symmetry about the illustrated axis is employed for simplicity of manufacturing.

DESCRIPTION OF THE PREFERRED EMBODIMENTS

Figure 1:
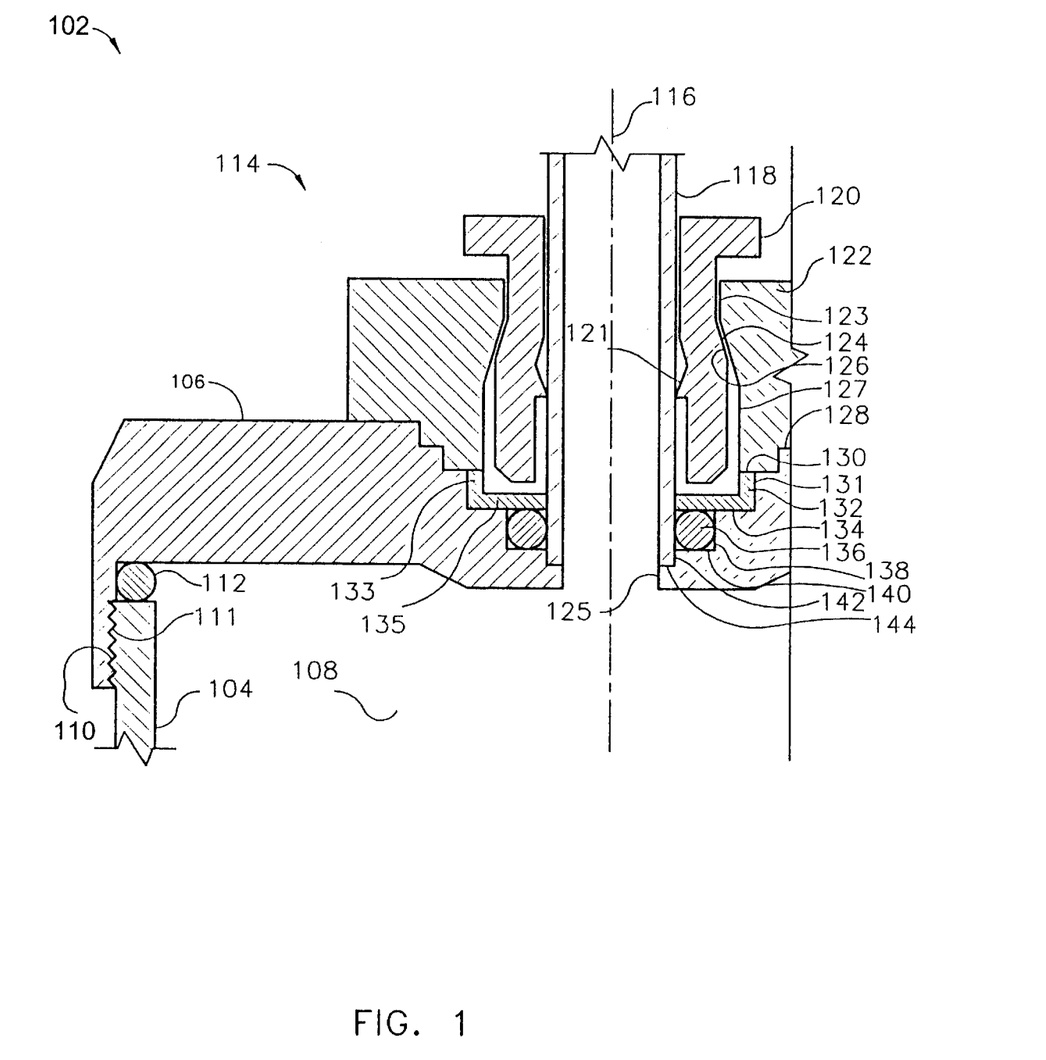
FIG. 1 is a cross section of a port in one embodiment of the present invention.

FIG. 1 is a cross section of port 114 of water purifier 102 in one embodiment of the present invention. Water purifier 102 is an example of a vessel used in fluid processing. By application of the teachings of FIG. 1, several completely enclosed vessel configurations are practicable. In a first configuration, barrel 104 is formed as a cup, having no other ports. A single port 114 supports operation of the vessel, for example, as a fluid capacitor. In another configuration, similar in all other respects with the configuration discussed above, cover 106 has multiple ports. In operation, each port provides fluid communication to enclosed volume 108. In yet another configuration, barrel 104 is formed as a tube having two open ends and a respective threaded surface at each end. A cover similar to cover 106 is joined to barrel 104 at the end not shown in FIG. 1. In further configurations, each such cover has multiple ports similar to port 114.

As illustrated, water purifier 102 includes port 114, cover 106, and barrel 104. In any of the above described configurations, port 114, having an axis 116, provides a fluidtight seal between tube 118 and enclosed volume 108. Tube 118 is pressed into port 114 in a direction along the axis and toward the enclosed volume 108, enclosed in part by cover 106 and barrel 104. Barrel 104, having a threaded surface 111, seals against O-ring 112 in cooperation with threaded surface 110 of cover 106.

Port 114 includes stepped bore 125 in cover 106, O-ring 136, support ring 132, collet retainer 122, and collet 120. Stepped bore 125 includes radial surface 144, axial surface 142, radial surface 140, axial surface 138, radial surface 134, axial surface 131 and a surface for joint 128. Radial surface 144 operates as a tube stop surface. Axial surface 142 opposes radial movement of tube 118 off axis 116. Radial surface 140 and axial surface 138 cooperate as a first step providing a sealing surface, 140 or 138 or both, for O-ring 136. Radial surface 134 and axial surface 131 cooperate as a second step, providing a supporting surface, 134 or 138 or both, for support ring 132. Support ring 132 fits snugly against tube 118 to couple a radial moment in tube 118 to the interior of bore 125, thereby retaining O-ring 136 on a sealing surface and maintaining the fluidtight seal.

Support ring 132 includes axial portion 133 and radial portion 135. In operation, support ring 132 bears in part against surface 131 and in part against surface 134. In an alternate embodiment, a functionally similar support ring bears against similar surfaces, though the alternate support ring is formed as a conventional thrust washer, having uniform thickness.

Collet retainer 122 includes bore 123, frustoconical surface 124, and axial surface 127. Collet 120 is of the conventional type having several fingers, two of which are shown in FIG. 1. Each finger has a tooth 121 that engages onto tube 118, preventing release of tube 118 from collet 120. Tube 118 is also of a conventional type formed of either a metal, such as copper, or of a somewhat more flexible material such as rubber or plastic.

To assemble the port, O-ring 136 is placed in stepped bore 125, followed by support ring 132. Collet retainer 122 is then conventionally joined to stepped bore 125 at joint 128. Finally, collet 120 is snapped into bore 123 in collet retainer 122, making support ring 132 captive in the port. Collet retainer 122 abuts support ring 132 at abutment surface 130, holding support ring 132 against surface 134 and against some compression resistance of O-ring 136.

When water purifier 102 is installed for operation, tube 118 is inserted on axis 116 through collet 120, support ring 132, and O-ring 136 until tube 118 meets bore radial surface 144 which operates as a tube stop surface. Water under pressure is then passed between tube 118 and enclosed volume 108. Water pressure forces tube 118 away from surface 144; however, surface 126 of collet 120 is thereby forced against frustoconical surface 124 of collet retainer 122 to retain tube 118 in mechanical communication with water purifier 102.

Figure 2:
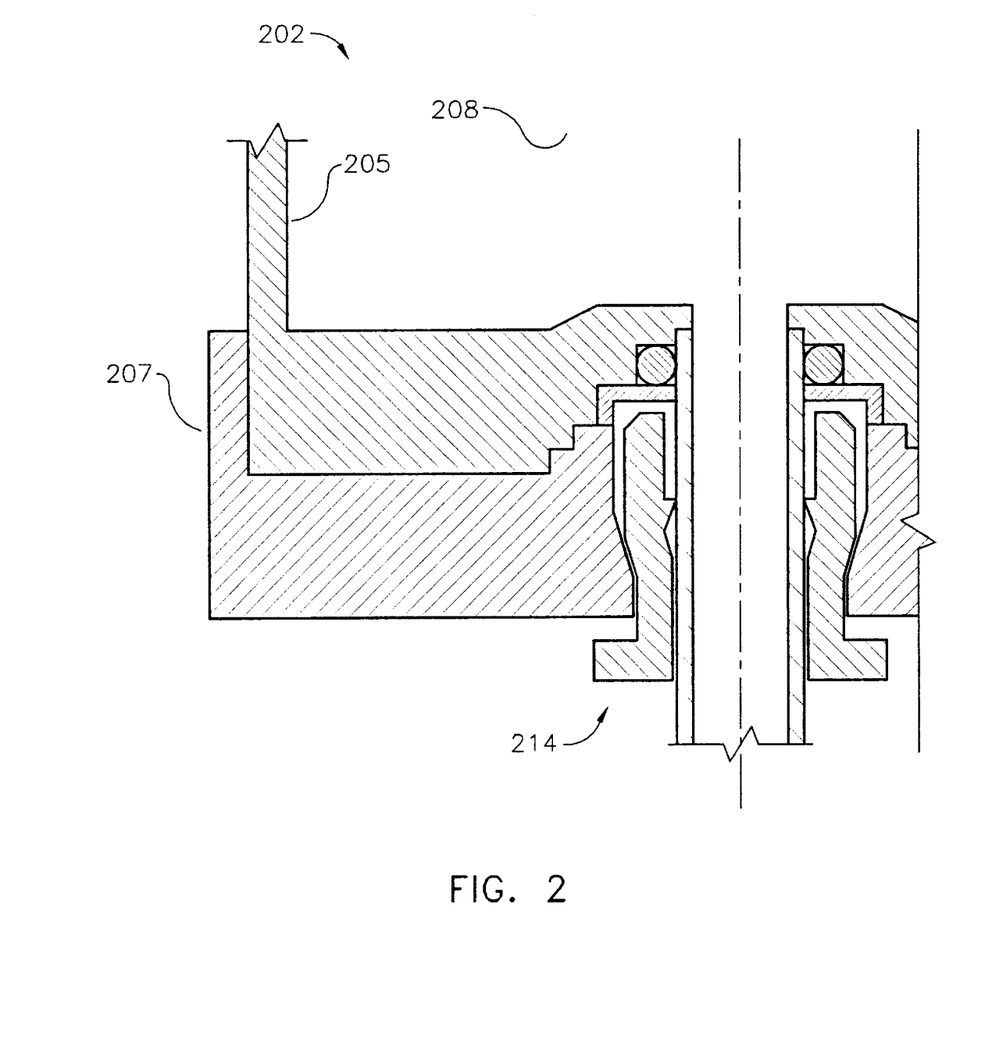
FIG. 2 is a cross section of a port in another embodiment of the present invention.

FIG. 2 is a cross section of port 214 of water purifier 202 in another embodiment of the present invention. Water purifier 202 is an example of a vessel used in fluid processing. By application of the teachings of FIGS. 1 and 2, several additional configurations are practicable. In a first configuration, barrel 205 is open at an opposite end, not shown, and a second collet retainer cap similar to collet retainer cap 207 is conventionally joined at that end to enclose volume 208. In another configuration, the structure shown in FIG. 2 is combined with the structure shown in FIG. 1 to form a complete enclosure. In such a configuration, items 104 and 205 identify one barrel that includes threaded surface 111 as shown in FIG. 1 for joining to cover 106. In yet another configuration, barrel 205 is manufactured as a complete prefabricated enclosure to which one or more collet retainer caps 207 are attached.

As illustrated, water purifier 202 includes port 214, collet retainer cap 207, and barrel 205. Port 214 is similar to port 114 described with reference to FIG. 1. Collet retainer cap 207 is similar to collet retainer 122, described with reference to FIG. 1, yet in addition, collet retainer cap 207 extends as a cap across barrel 205. By extending across barrel 205, collet retainer cap 207 provides additional structural integrity to the enclosure.

Figure 3:
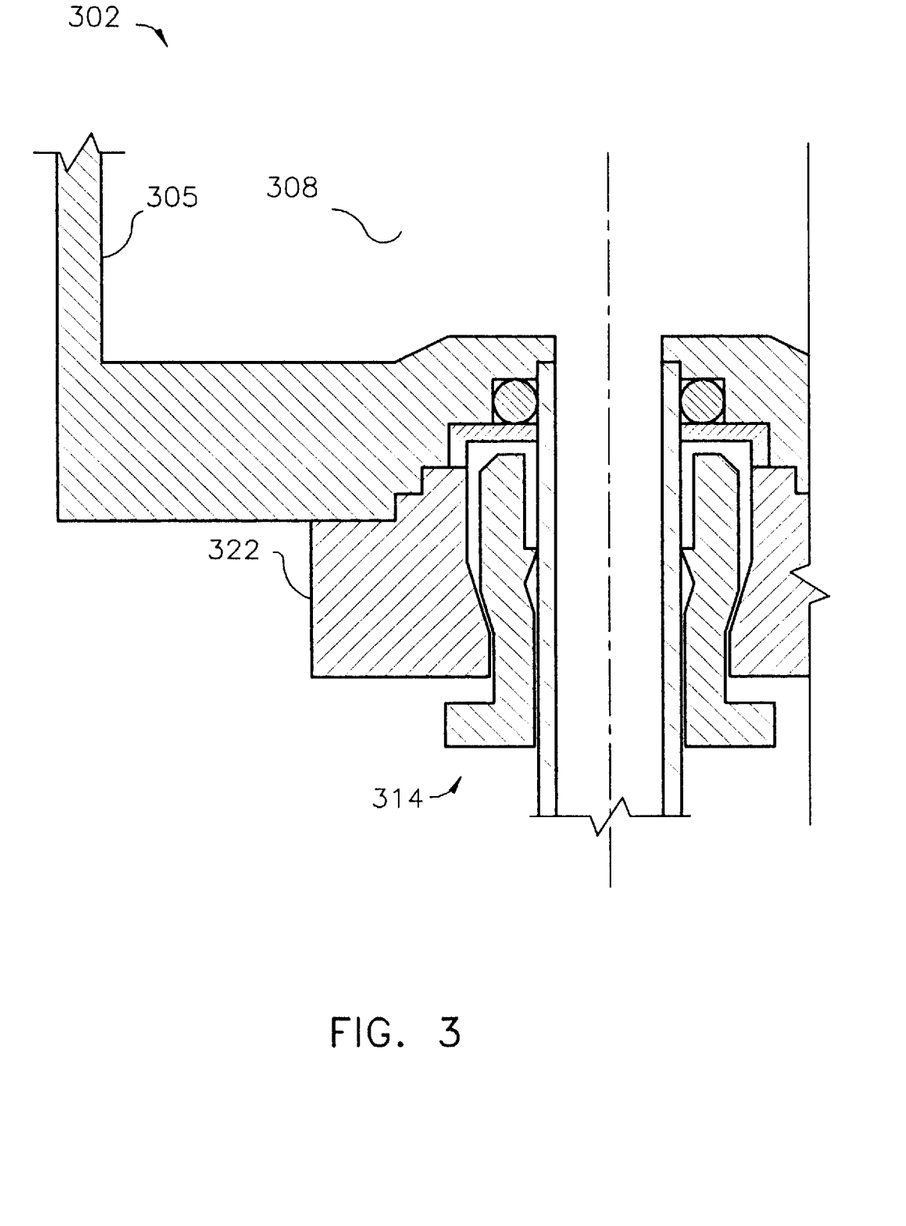
FIG. 3 is a cross section of a port in yet another embodiment of the present invention.

FIG. 3 is a cross section of port 314 of water purifier 302 in yet another embodiment of the present invention. As illustrated, water purifier 302 includes port 314, collet retainer 322, and barrel 305 surrounding enclosed space 308. Port 314 is similar to port 114 discussed with reference to FIG. 1. Also, collet retainer 322 is similar to collet retainer 122 discussed with reference to FIG. 1.

In an important embodiment of a water purifier of the present invention, the structure of FIG. 1 is combined with the structure of FIG. 3 to form a complete enclosure. In such a configuration, items 104 and 305 identify one barrel that includes threaded surface 111 for joining to cover 106. This configuration is preferred when using collet retainers because common parts are used at each port 114 and 314, simplifying manufacture.

Figure 4:
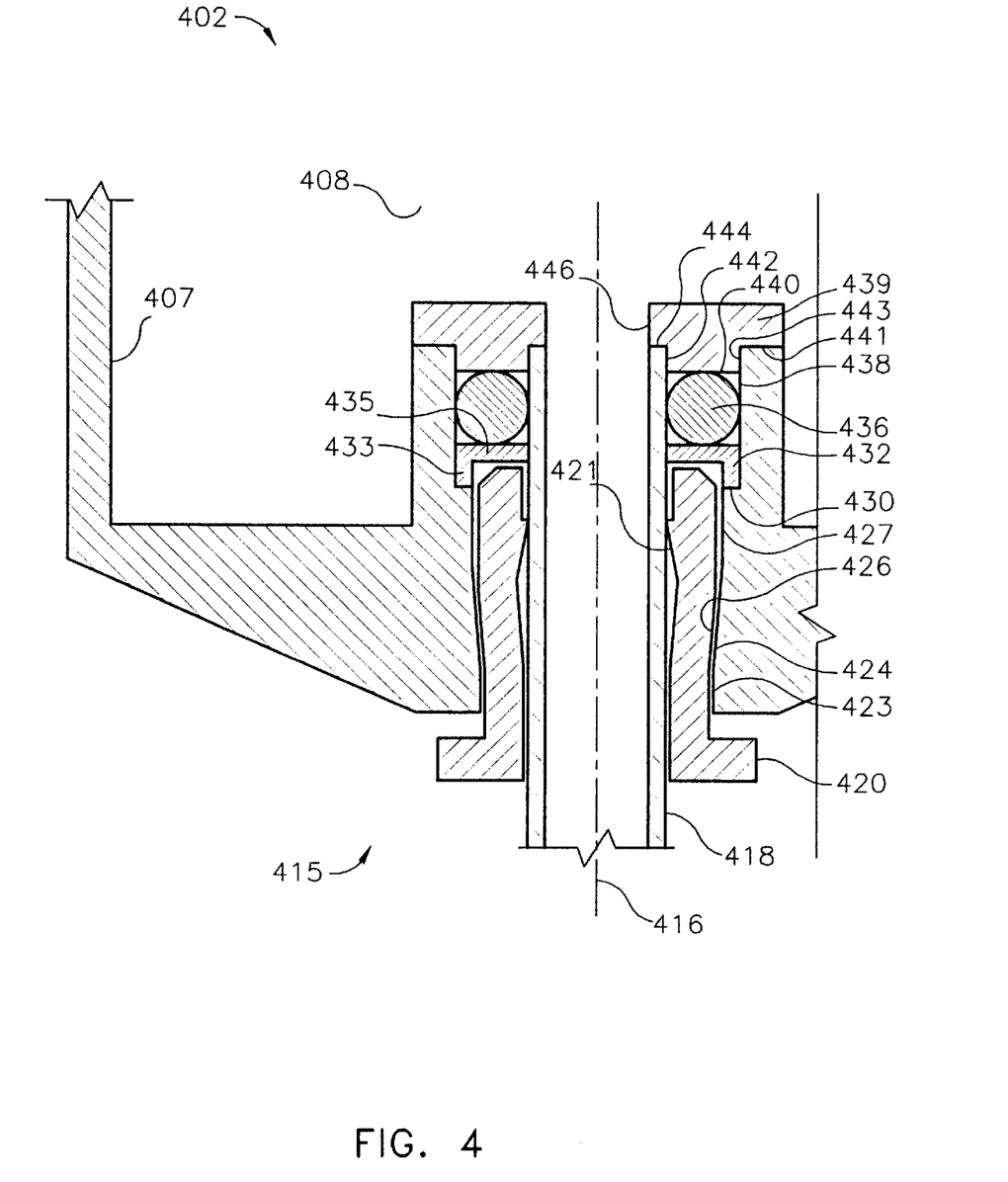
FIG. 4 is a cross section of a port in still another embodiment of the present invention.

FIG. 4 is a cross section of port 415 of water purifier 402 in still another embodiment of the present invention. Water purifier 402 is an example of a vessel used in fluid processing. In a first configuration, barrel 407 is open at an opposite end, not shown, and a collet retainer cap similar to collet retainer cap 207 is conventionally joined at that end to enclose volume 408. In another configuration, the structure shown in FIG. 4 is combined with the structure shown in FIG. 1 to form a complete enclosure. In such a configuration, items 104 and 407 identify one barrel that includes threaded surface 111 as shown in FIG. 1 for joining to cover 106.

As illustrated, water purifier 402 includes port 415 and barrel 407. In any of the above described configurations, port 415 provides a fluidtight seal between tube 418 and enclosed volume 408. Tube 418 is pressed into port 415, having an axis 416, in a direction along the axis and toward the enclosed volume 408, enclosed in part by barrel 407.

Port 415 includes collet 420, bore 423 in barrel 407, support ring 432, O-ring 436, and plug 439. Collet 420 is of the conventional type having several fingers, two of which are shown in FIG. 4. Each finger has a tooth 421 that engages onto tube 418, preventing release of tube 418 from collet 420. Tube 418 is also of the conventional type formed of either a metal, such as copper, or of a somewhat more flexible material such as rubber or plastic.

Bore 423 includes frustoconical surface 424, axial surface 427, radial surface 430, axial surface 438, and radial surface 441. Radial surface 430 and axial surface 438 cooperate as a step providing a supporting surface, 430 or 438 or both, for support ring 432. Axial surface 438 and surface 440 of plug 439 cooperate to provide a sealing surface, 440 or 439 or both, for O-ring 436. Support ring 432 fits snugly against tube 418 to couple a radial moment in tube 418 to interior surfaces of bore 423, thereby retaining O-ring 436 on a sealing surface and maintaining the fluidtight seal.

Support ring 432 includes axial portion 433 and radial portion 435. In operation, support ring 432 bears in part against surface 430 and in part against surface 438. In an alternate embodiment, a functionally similar support ring bears against similar surfaces, though the alternate support ring is formed as a conventional thrust washer, having uniform thickness.

Plug 439 includes bore 446, radial surface 440, axial surface 443, and radial surface 441. Radial surface 444 and axial surface 442 cooperate as a step to hold tube 418 in proper position. Surface 442 fits snugly against tube 418 to limit radial movement of tube 418 off axis 416. Surface 444 provides a tube stop surface, locating tube 418 at a preferred position within bore 423 in relation to O-ring 436 and support ring 432. Axial surface 443 and radial surface 441 cooperate as a step to properly locate plug 439 in bore 423.

To assemble port 415, support ring 432 is placed in bore 423, followed by O-ring 436. Plug 439 is then joined to barrel 407 by conventional technique such as welding or applying an adhesive. Plug 439 applies some tension via O-ring 436 to support ring 432 to hold support ring 432 against abutment surface 430. Support ring 432 is thereby made captive to port 415. Finally, collet 420 is snapped into bore 423.

When water purifier 402 is installed for operation, tube 418 is inserted on axis 416 through collet 420, support ring 432, and O-ring 436 until tube 418 meets plug radial surface 444 which operates as a tube stop surface. Water under pressure is then passed between tube 418 and enclosed volume 408. Water pressure forces tube 418 away from surface 444; however, collet 420 is thereby forced against frustoconical surface 424 of bore 423 to retain tube 418 in mechanical communication with water purifier 402.

Figure 5:
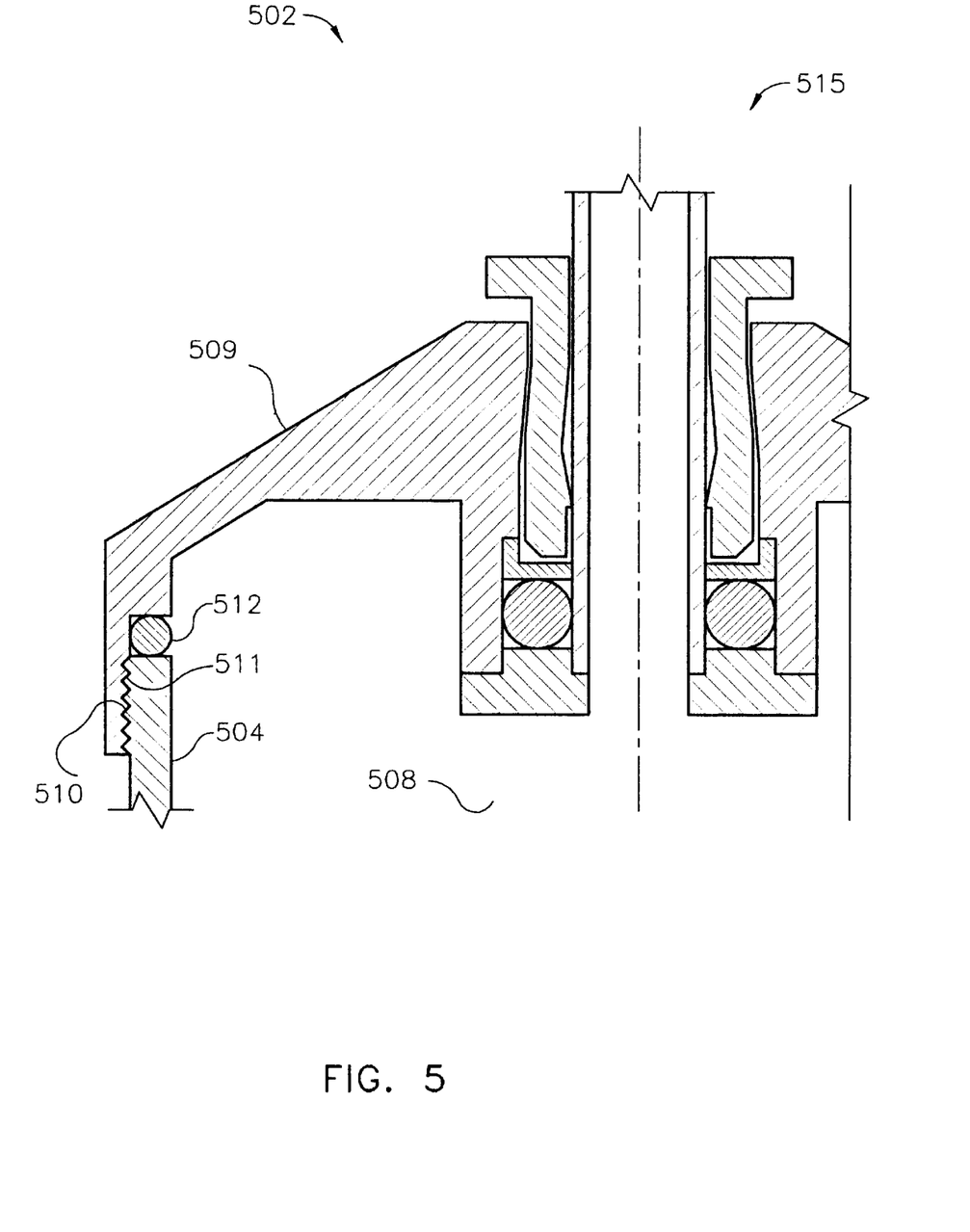
FIG. 5 is a cross section of a port in yet a further embodiment of the present invention.

FIG. 5 is a cross section of port 515 of water purifier 502 in yet a further embodiment of the present invention. Water purifier 502 is an example of a vessel used in fluid processing. When the structure shown in FIG. 5 is used in any of the aforementioned configurations to replace the structure described with reference to FIG. 1, numerous further practicable configurations result. Of these configurations, a water purifier in a preferred embodiment combines the structures of FIGS. 4 and 5. In such an embodiment, items 407 and 504 identify one barrel that includes threaded surface 511 as shown in FIG. 5 for joining to cover 509. Such an embodiment is preferred for several reasons which reduce manufacturing costs and increase market penetration. These reasons include simplicity of manufacture; aesthetic quality of the exterior surface; maintainability of the exterior surface; simplicity, uniformity, and consequential reliability of ports 415 and 515; and commonality of port components.

As illustrated, water purifier 502 includes port 515, cover 509, O-ring 512, and barrel 504. In any of the above described configurations, port 515 provides a fluidtight seal between tube 518 and enclosed volume 508. Port 515 is similar to port 415 discussed with reference to FIG. 4. The cooperation of cover 509 having threaded surface 510, O-ring 512, and barrel 504 having threaded surface 511 is similar to features shown and described in FIG. 1, namely, cover 106, surface 110, O-ring 112, barrel 104, and surface 111.

The foregoing description discusses preferred embodiments of the present invention, which may be changed or modified without departing from the scope of the present invention. Those skilled in the art will understand that the configurations discussed above are examples of embodiments of the present invention. Though substitute materials are known, all illustrated parts are manufactured of plastic, synthetic rubber, or rubber, respectively, of grades selected to meet the performance requirements of the fluid process. For purifying water at conventional pressures, O-rings are conventionally formed of rubber or neoprene and all other parts are conventionally formed of polyethylene. Enclosed volumes 108, 208, 308, 408, and 508 include conventional apparatus for water purification, not shown. Conventional baffles, walls, filtering materials, processing zones, and the like are included in the enclosed volume in alternate embodiments to channel, direct, block, distribute, combine, filter, impart reagents to, remove substances from, and otherwise process fluid flow within the enclosed volume.

Still further, bores described above may be formed by removing material by conventional techniques or by casting to the desired shape. In an alternate embodiment, rough casting is followed by further removal of material to obtain desired tolerances of manufacturing.

Other known seals may be used as functional replacements for O-rings shown and described. For example, resilient washers and known gasketing materials are equivalent.

Tube stop surfaces are omitted in further embodiments wherein sufficient tube insertion is assured by conventional means, including for example, markings on the tube and methods involving grasping the tube at a measured distance from the end to be inserted.

These and other changes and modifications are intended to be included within the scope of the present invention. While for the sake of clarity and ease of description, several specific embodiments of the invention have been described; the scope of the invention is intended to be measured by the claims as set forth below. The description is not intended to be exhaustive or to limit the invention to the form disclosed. Other embodiments of the invention will be apparent to one of ordinary skill in the art in light of the disclosure and upon practice of the invention.

Although this invention has been described above with reference to particular means, materials, and embodiments, it is to be understood that the invention is not limited to these disclosed particulars, but extends instead to all equivalents within the scope of the following claims.

What is claimed is:

1. A water purifier that receives a provided tube with a provided collet, the tube for conducting water, the purifier providing a fluid seal to the tube, the purifier comprising:
   a. a collet retainer that retains the collet and the tube in mechanical communication with the water purifier;
   b. first means for purifying water, the first means in fluid communication with the tube and enclosed by an enclosure, the enclosure joined to the collet retainer, the enclosure comprising a stepped bore, the bore comprising a first step at a first diameter, a second step at a second diameter greater than the first diameter, the first step providing a sealing surface, and the second step providing a supporting surface;
   c. an O-ring on the sealing surface, for sealing the tube to the sealing surface; and
   d. a support ring in mechanical communication with the first step to retain the O-ring on the sealing surface, the support ring in further mechanical communication with the supporting surface, wherein the support resists a radial moment in the tube by coupling the moment to the enclosure through the support ring.

2. The water purifier of claim 1 wherein the enclosure comprises an integral barrel that surrounds the first means.

3. The water purifier of claim 2 wherein:
   a. the barrel comprises a first end; and
   b. the collet retainer comprises a cap over the first end.

4. The water purifier of claim 2 wherein the enclosure further comprises a cover joined to the barrel.

5. The water purifier of claim 4 wherein the cover receives a second provided tube with a second provided collet, the second tube in fluid communication with the first means, the cover comprising:
   a. a second collet retainer that retains the second collet and the second tube in mechanical communication with the water purifier;
   b. a second stepped bore, the second bore comprising a third step at a third diameter, a fourth step at a fourth diameter greater than the third diameter, the third step providing a second sealing surface, and the fourth step providing a second supporting surface;
   c. a second O-ring on the second sealing surface, for sealing the second tube to the second sealing surface; and
   d. a second support ring in mechanical communication with the third step to retain the second O-ring on the second sealing surface, the second support ring in further mechanical communication with the second supporting surface, wherein the second support ring resists a second radial moment in the second tube by coupling the second moment to the cover through the second support ring.

6. A water purifier, water being conducted to the water purifier via a provided tube, the water purifier comprising:
   a. means for purifying water; and
   b. an enclosure for enclosing the means for purifying water, the enclosure comprising:
      (1) a bore having a first end and a second end, a longitudinal axis, and a radial dimension, the bore comprising an abutment surface within the bore;
      (2) a support ring received within the bore in mechanical communication with the abutment surface for contacting a tube and resisting radial movement of the tube;
      (3) an O-ring received in the bore adjacent to the support ring for sealing the tube to the enclosure;
      (4) a plug joined to the bore at the second end of the bore and extending radially into the bore, the plug contacting the O-ring and retaining the O-ring between the plug and the support ring.

7. The water purifier of claim 6 wherein the enclosure further comprises an integral barrel that surrounds the means for purifying water.

8. The water purifier of claim 7 wherein the enclosure further comprises a cover joined to the barrel.

9. The water purifier of claim 8 wherein the cover receives a second tube that carries the water, the cover comprising:
   a. a second bore, the second bore comprising a second frustoconical surface at a first end of the second bore, and comprising a second abutment surface within the second bore;
   b. a second support ring within the second bore and in mechanical communication with the second abutment surface;
   c. a second plug, joined to the second bore at a second end of the second bore; and
   d. a second O-ring that seals the second tube to the cover.

10. The water purifier of claim 6, wherein the plug comprises a radial surface extending radially into the bore for contacting and stopping an end of the tube.

11. The water purifier of claim 10 wherein the enclosure further comprises an integral barrel that surrounds the means for purifying water and a cover joined to the barrel, wherein the cover receives a second tube that carries the water and the cover comprises:
   a. a second bore, the second bore comprising a second frustoconical surface at a first end of the second bore, and comprising a second abutment surface within the second bore;
   b. a second support ring received within the second bore and in mechanical communication with the second abutment surface;
   c. a second plug, joined to the second bore at a second end of the second bore; and
   d. a second O-ring, received within the second bore between the second support ring and the second plug, for sealing the second tube to the cover.

12. The water purifier of claim 6 wherein the bore comprises a frustoconical surface near the first end of the bore and wherein the water purifier further comprises a collet received in said bore near the first end for receiving the tube.

13. A method for assembling a vessel for fluid processing, the vessel having a bore for receiving a tube, the bore having an axis, axial assembly being in a first direction on the axis and on a second direction on the axis, the second direction being opposite the first direction, the vessel for receiving the tube as introduced into the vessel in the first direction, the method comprising, in sequence:
   a. inserting a support ring into the bore in the second direction;
   b. inserting an O-ring into the bore in the second direction; and
   c. joining a plug to the vessel over the bore.

14. The method of claim 13 further comprising, without regard to sequence:

introducing a means for fluid processing into the vessel; and sealing the vessel.

15. The method of claim 13 further comprising, without regard to sequence, inserting a collet into the bore.

16. A method for assembling a water purifier, the purifier comprising a first body portion for receiving a first tube through a first bore in the first body portion, and a second body portion for receiving a second tube through a second bore in the second body portion, the purifier, when assembled, having an enclosed interior space, the method comprising:

a. inserting a first support ring into the first bore, insertion proceeding away from the interior space;

b. inserting a first O-ring into the first bore, insertion proceeding away from the interior space;

c. joining a plug to the vessel over the first bore to retain the first O-ring within the first bore;

d. inserting a second support ring into the second bore, insertion proceeding away from the interior space;

e. inserting a second O-ring into the second bore, insertion proceeding away from the interior space;

f. joining a second plug to the vessel over the second bore to retain the second O-ring within the second bore;

g. arranging a first means for water purification within the interior space; and h. defining the enclosed interior space by sealing the first body portion in mechanical communication with the second body portion to enclose the first means.

17. The method of claim 16 further comprising inserting a first collet into the first bore, insertion proceeding into the interior space.

18. The method of claim 17 further comprising inserting the first tube through the first collet.

19. The method of claim 16 wherein the step of defining comprises joining the first body portion to the second body portion.

20. The method of claim 16 wherein the step of defining comprises:

a. sealing the first body portion to the first means; and b. sealing the second body portion to the first means.

* * * * *